US008028599B2

(12) United States Patent
Mack

(10) Patent No.: US 8,028,599 B2
(45) Date of Patent: Oct. 4, 2011

(54) VEHICLE

(75) Inventor: Franz Mack, Kirchdorf (DE)

(73) Assignee: Kaessbohrer Gelaendefahrzeug AG, Laupheim (DE)

( * ) Notice: Subject to any disclaimer, the term of this patent is extended or adjusted under 35 U.S.C. 154(b) by 798 days.

(21) Appl. No.: 12/082,694

(22) Filed: Apr. 11, 2008

(65) Prior Publication Data

US 2008/0250889 A1 Oct. 16, 2008

(30) Foreign Application Priority Data

Apr. 12, 2007 (DE) .......................... 10 2007 018 246

(51) Int. Cl.
*G05G 9/047* (2006.01)
*G06F 3/033* (2006.01)

(52) U.S. Cl. .................................. 74/471 XY; 345/161

(58) Field of Classification Search ............. 74/471 XY; 463/36, 37, 38, 43; 345/161, 173, 174; 324/207.25; 701/29, 31; 714/25–57; 434/29, 30, 33, 434/45, 61, 62, 71
See application file for complete search history.

(56) References Cited

U.S. PATENT DOCUMENTS

| 4,656,461 A | | 4/1987 | Morsch et al. |
| 4,702,520 A | | 10/1987 | Whisler et al. |
| 5,610,631 A | * | 3/1997 | Bouton et al. ................. 345/161 |
| 6,948,398 B2 | * | 9/2005 | Dybro ....................... 74/471 XY |
| 7,029,257 B2 | * | 4/2006 | Lee et al. ....................... 425/116 |
| 7,757,579 B2 | * | 7/2010 | Bloch ...................... 74/471 XY |

| 2002/0157284 A1 | | 10/2002 | Tamaru et al. |
| 2004/0023719 A1 | * | 2/2004 | Hussaini et al. ................. 463/37 |
| 2004/0221674 A1 | * | 11/2004 | Kornelson ................ 74/471 XY |
| 2006/0053926 A1 | | 3/2006 | Cooper et al. |
| 2008/0136792 A1 | * | 6/2008 | Peng et al. ..................... 345/174 |

FOREIGN PATENT DOCUMENTS

| DE | 83 37 596.1 | 3/1984 |
| DE | 201 07 719 U1 | 9/2002 |
| DE | 10 2005 014 774 A1 | 10/2006 |
| DE | 10 2005 017 013 A1 | 10/2006 |
| EP | 0 178 171 A2 | 4/1986 |
| GB | 2 165 664 A | 4/1986 |
| WO | WO 2004/010239 A1 | 1/2004 |
| WO | WO 2006/104440 A1 | 10/2006 |

OTHER PUBLICATIONS

Office Action of Germany Patent Office dated Jan. 15, 2008 (3 pages).
European Patent Office Search Report dated Jul. 16, 2008 (6 pages).

* cited by examiner

*Primary Examiner* — Thomas R Hannon
*Assistant Examiner* — Phillip A Johnson
(74) *Attorney, Agent, or Firm* — Flynn, Thiel, Boutell & Tanis, P.C.

(57) ABSTRACT

1. Vehicle (10), in particular tracked vehicle (10).
2.1 The invention relates to a vehicle (10), in particular a tracked vehicle (10), having a manual controller (40) for controlling driving functions of the vehicle (10) and/or additional functions of the vehicle (10), the manual controller (40) having a base (42) and a handle which can move in relation to the base (44) and is designed such that it can pivot at least about a substantially horizontal pivot axis (44a, 44b) for control purposes.
2.2 According to the invention, the handle (44) has a contact zone (46) which is to be held by the inner surface of a hand, the manual controller (40) having at least one touch sensor (50, 52) which is designed to detect that a user is touching the handle (44).

5 Claims, 2 Drawing Sheets

VEHICLE

The invention relates to a vehicle, in particular a tracked vehicle, having a manual controller for controlling driving functions of the vehicle and/or additional functions of the vehicle, the manual controller having a base and a handle which can move in relation to the base and is designed such that it can pivot at least about a substantially horizontal pivot axis for control purposes.

A manual controller of this type is disclosed in connection with tracked vehicles in DE 10 2005 017 013 A1. The manual control unit described there is held by a hand of the vehicle driver during operation, operator control then being possible firstly by means of control elements, for example buttons or thumbwheels on the handle, and secondly by means of tilting the entire handle.

The degrees of freedom by which the handle can be moved in manual controllers of vehicles of this generic type are usually degrees of freedom for a pivoting movement about pivot axes oriented in the longitudinal direction of the vehicle or the transverse direction of the vehicle.

PROBLEM AND SOLUTION

The problem addressed by the invention is that of developing a vehicle of this generic type with regard to the manual controller from the points of view of ergonomics and safety.

This problem is solved by a vehicle of this generic type, in which the handle has a contact zone which is to be held by the inner surface of a hand, and the manual controller has at least one touch sensor which is designed to detect that a vehicle driver is touching the handle.

The touch sensor is designed to the effect that it makes available for electronic evaluation information about whether the handle of the manual controller is held by a vehicle driver. This information can be used in a wide variety of ways. It allows specific vehicle functions to be made depending on whether the vehicle driver is currently able to directly intervene in the vehicle functions. If this is not the case, as can be identified by contact not been detected, safety-critical functions of the vehicle can be deactivated or influenced in some other way. Furthermore, such contact can also be used, for example, to switch driving functions or additional functions of the vehicle to a readiness mode, since contact being made by the vehicle driver indicates that operation of the manual controller is to be expected in the immediate future.

A large number of possible refinements of the touch sensor are feasible and included in the invention. Touch sensors in connection with the invention are any sensors which can identify the clear presence of the hand of the vehicle driver on the handle of the manual controller even without any further control function having to be activated by the vehicle driver. Sensors which are arranged directly in the region of the contact zone are particularly expedient. Sensors of this type can be developed such that they output a signal value which is characteristic of contact even without the hand exerting any force. In this case, expedient measurement variables may be an electrical resistance which is influenced by the body heat or the electrical resistance of the skin on the inner surface of the hand. Capacitive sensors can also be readily used as touch sensors. Sensors which react to a force exerted by the vehicle driver are likewise expedient. Therefore, by way of example, pressure sensors on the surface of the handle can reliably identify whether the handle is firmly held by the hand of the vehicle driver.

Particularly preferred refinements are those in which a plurality of, in particular different, touch sensors are present, the output signals from said touch sensors being jointly evaluated, so that reliable identification of contact is still possible even in the event of failure of one touch sensor or with special boundary conditions which fundamentally make one touch sensor ineffective.

In a preferred development, the handle has a spherically curved central section for ergonomically supporting the inner surface of a hand, which central section forms an upper apex surface of the handle. A handle of this type can be operated particularly without causing fatigue since it does not require any tensing of muscles in order to stay in contact with the handle. To this extent, it is advantageous compared to a conventional joystick since a joystick of this type has to be permanently held. In a handle with a spherically curved central section, the touch sensor is preferably provided in the region of the central section since the inner surface of the hand, which is usually not removed from the handle during operator control of the vehicle, rests here.

The touch sensor can advantageously be in the form of a force or pressure sensor which is designed to measure a force acting on the handle in the vertical direction of the vehicle or a pressure acting on the handle in the vertical direction of the vehicle. A refinement of the touch sensor of this type has the advantage that it does not matter if, possibly due to the use of gloves or due to cold weather conditions, the presence of the hand of the operator cannot be reliably detected by means of a change in electrical resistance on account of body temperature. A force or pressure sensor of this type is advantageous particularly in the case of handles in which, on account of their shape, provision is made for the hand of the operator to rest in a way which leads to permanent or virtually permanent application of force on the handle downward in the vertical direction of the vehicle during operation. A corresponding force or pressure sensor can be provided directly in the region of the contact surface. However, configurations in which the force and/or pressure sensor is provided in another location, for example a shaft of the handle, are also feasible and included in the invention.

In a development of the invention, the vehicle has a control unit which is connected to the manual controller and, in order to process output data from the manual controller, is designed in such a way that the output data from the manual controller is converted into control signals for actuators and/or motors, which are connected to the controller, of the vehicle as a function of sensor data from the touch sensor.

Accordingly, the control unit processes firstly the output data from the manual controller, which data relates to control of driving and additional functions of the vehicle, and secondly the sensor data from the touch sensor. This permits particularly reliable operator control of the vehicle. Therefore, in the case of evaluation to the effect that actuators and/or motors of the vehicle are operated only when the touch sensor or the touch sensors indicate contact, it is ensured that driving functions are not undesirably triggered or continued, for example due to the handle unintentionally remaining in a pivoted position. Furthermore, imprecise calibration of the handle can be compensated for, so that, given corresponding configuration of the control unit, deflection of the handle out of an inoperative position is converted into control signals for the connected actuators and/or motors only if said deflection is either a considerable deflection or else a small deflection together with a positive signal from the touch sensor.

One development of the invention makes provision for the control unit to be designed to switch actuators and/or motors, which are connected to the control unit, to an inoperative position if the touch sensor does not detect any contact. In this context, an inoperative position is understood to be a position which represents a particularly low risk to man and machine. In the case of driving functions, the inoperative position includes, in particular, the drive motors being stationary. In the case of additional functions of the vehicle, for example hoisting or treatment with a rake blade, functions which differ from a stationary function can be considered as preferred from safety points of view. Switching the actuators and/or motors to an inoperative position constitutes a safety function which comes into effect firstly when the vehicle driver is no longer able to control the vehicle in an emergency situation, but which secondly can also be used in a deliberate manner, for example by a vehicle driver establishing a stable situation by reflexively releasing the handle when a problematic driving situation is imminent.

It is likewise expedient for the control unit to be designed to output a warning signal if the touch sensor does not detect any contact. A warning signal of this type can be visual or, preferably, acoustic. It depends, in particular, on the vehicle driver, who is prompted by the warning signal to take hold of the handle again. As a result of a refinement of the control unit of this type, said vehicle driver is stopped from carelessly causing a dangerous situation which may arise from the driver releasing the handle and therefore increasing the reaction time if it is necessary to intervene in the driving or additional functions.

The problem is likewise solved by a vehicle of this generic type, in which the handle of the manual controller is designed such that it can pivot about a substantially vertical pivot axis in relation to the base for control purposes.

The ability of the handle to pivot about the substantially vertical pivot axis is used for parameters of the driving or additional functions which are to be analogously set, for example the driving direction, the driving speed or the pivot angle of attached equipment such as rake blades or the like. In the manual controllers known from the prior art, two orthogonal and substantially horizontally oriented pivot axes are usually used. On account of the ability of the handle to pivot about a further substantially vertical pivot axis, a further function can be added without one of the horizontal pivot axes having to be allocated a double function for this purpose.

The ability of the handle to pivot about the vertical pivot axis is preferably developed such that the handle is always pressed back into an inoperative orientation by a restoring force.

Provision is preferably made of a control unit which is connected to the manual controller and, in order to evaluate a pivot position about the vertical pivot axis, is designed to the effect that driving functions or additional functions of the vehicle are influenced in the same way as the pivot position of the handle about the vertical pivot axis by means of actuators and/or motors which are connected to the controller. As a result, the vertical pivot axis of the handle and the associated option to pivot can be used in a particularly intuitive manner for driving or additional functions. An additional function may be, for example, setting the alignment of a rake blade or else moving an extension arm, for example a winch extension arm. Pivoting the handle about the vertical axis to the left results in the rake blade or the extension arm likewise pivoting to the left.

The problem is likewise solved by it being possible to set a home position of the handle, in which position the handle is not acted on by an external force, with regard to position and/or orientation. As a result, it is possible to take into account the special requirements of a vehicle driver by matching the orientation or the position of the handle to his personal body dimensions and as he desires. In particular, the entire handle can be moved in a translatory manner or can be pivoted such that a main direction of extent of the handle in an inoperative position is oriented in a specially adapted manner without an external force being applied.

An embodiment in which this is achieved by it being possible to set the position and/or the orientation of the base is particularly preferred. In a refinement of this type, the position or orientation of the base and the handle are set together, so that a setting means which changes the position of the handle and the base relative to one another is not required. This leads to comparatively simple implementation.

In one development of the invention, the base can pivot about a transverse axis of the vehicle, about a longitudinal axis of the vehicle and/or about a vertical axis of the vehicle and/or move in a translatory manner along these axes, and is designed such that it can be locked in a fixed position. Therefore, account can be taken of the individual requirements of the vehicle driver to a great extent. The ability to lock ensures that a setting is maintained once it is made. Implementing the ability to pivot and move can be achieved by a large number of different means, for example by means of axial sections which are provided on the base and engage in mounts fixed to the vehicle and thus permit the base to pivot.

In one development of the invention, a pivot region, within which the handle is designed such that it can pivot about the substantially horizontal pivot axis in relation to the base, can be set with regard to the end position of the handle. In this refinement, the base can be designed to be fixed to the vehicle. The pivot region is individually adapted by defining the end positions, which bound the pivot region, and/or the rest position of the handle.

The problem is also solved by a vehicle of this generic type which has a control unit which is connected to the manual controller and by means of which output data from at least one manually operable control element and/or output data relating to a pivot position of the handle in relation to the base is processed, the control unit allowing the user to assign the control element and/or the pivot position of the handle to a driving function and/or additional function. The user is accordingly able to make an individual assignment which defines the way in which operation of the manual controller affects driving functions and/or additional functions of the vehicle. A vehicle driver can therefore allocate, for example, buttons, thumbwheels or other control elements provided on the handle with the information which he requires most often. Furthermore, he is also able to flexibly link the reaction of driving or additional functions of the vehicle with degrees of freedom of the handle in relation to the base. A large number of further functions over and above this are also possible in this context, for example the double allocation of functions, so that pivoting of the handle can execute different functions depending on which key is simultaneously pressed. The control unit preferably has a memory in which the assignments can be permanently stored. The control unit can then access the assignment tables stored in this way in order to indirectly convert a control command arriving from the manual controller into an actuator or motor movement. Flexible assignment also permits a plurality of assignment profiles, which comprise respectively preferred settings for a plurality of vehicle drivers, to be stored in the memory of the control unit.

In one development of the invention, the controller has an output device, preferably an inspection monitor by means of which output data from the manual controller and preferably the respectively associated driving functions and/or additional functions are reproduced and displayed. This output device facilitates assignment of the driving functions and/or the additional functions to the various control elements and degrees of freedom of the handle. When making the assignments, the vehicle driver has an overview of how the various control elements and degrees of freedom of the handle are currently allocated and can influence the allocation.

In this case, the controller can particularly preferably be switched to an inspection mode in which operation of the manual controller is reproduced by the output device, but the driving functions and/or additional functions are not influenced. This is particularly expedient when setting the control elements and degrees of freedom of the handle. It permits the operator to virtually simulate operator control, in which case he can immediately identify which driving or additional function is influenced by his current operation. In this case, it is particularly advantageous for the output device to show how the vehicle would be influenced by the respective operation in a graphical manner with reference to an image of the vehicle and of parts of said vehicle. The inspection mode is also expedient for fault finding since it allows the functional reliability of the manual controller to be checked in a simple manner.

In one development of the invention, the manual controller is connected to the control unit by means of a bus system, preferably by means of a CAN bus. This permits the use of common components, this being advantageous from an economical point of view. As a result, it is also possible to be prepared for future developments without being restricted in this case, for example by the number of available lines between the manual controller and the control unit.

BRIEF DESCRIPTION OF THE DRAWINGS

Further advantages and features of the invention can be found in the claims and in the following description of a preferred exemplary embodiment of the invention, this exemplary embodiment being illustrated with reference to the drawings, in which:

DETAILED DESCRIPTION OF THE EXEMPLARY EMBODIMENT

Figure 1:
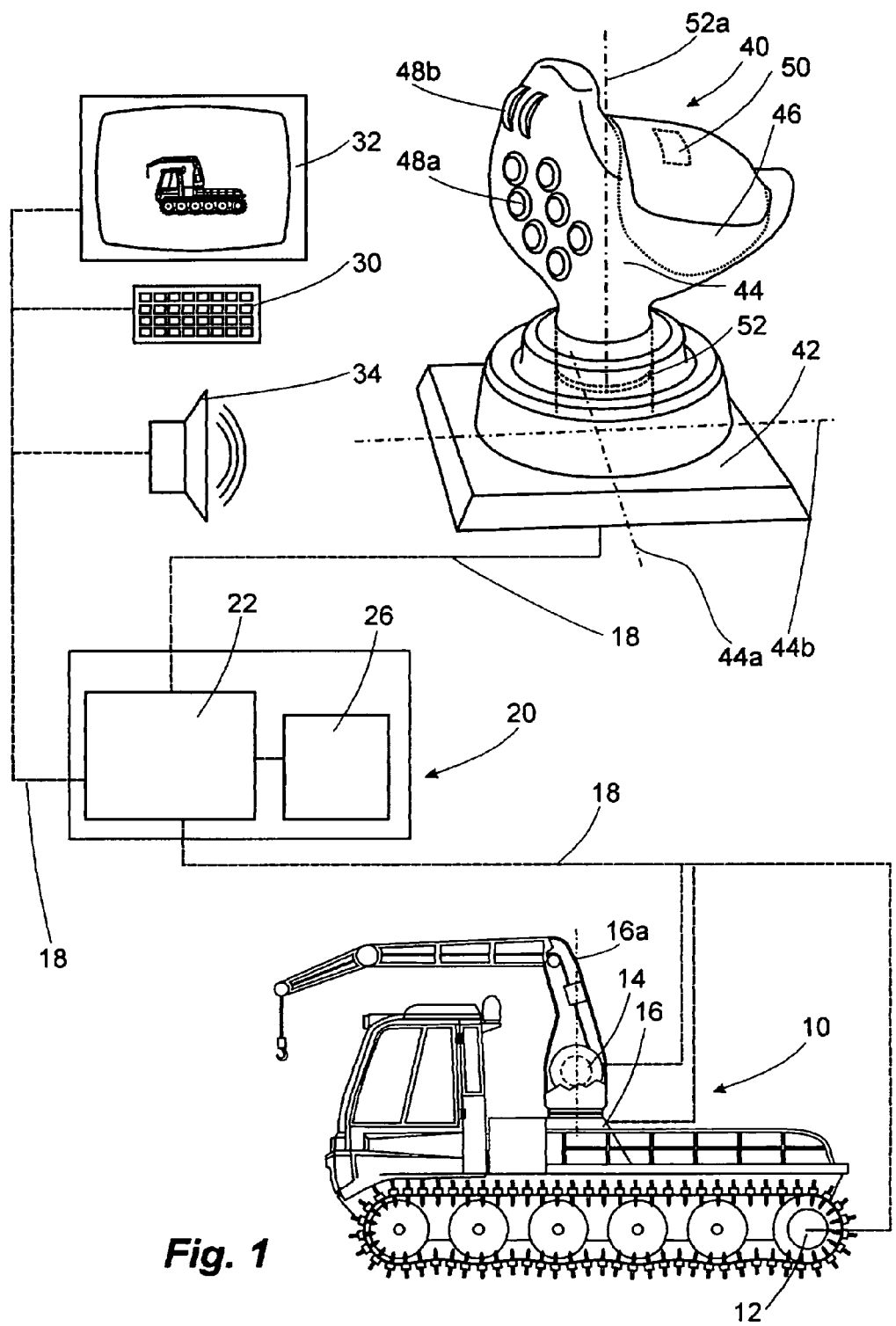
FIG. 1 shows a schematic illustration of a complete system, comprising manual controller, control unit, visual output device, acoustic output device, input device and the vehicle containing these components.

FIG. 1 shows a schematic illustration of a vehicle 10 according to the invention and its control system, comprising a control unit 20, an input unit 30, an output screen 32, an acoustic signal transmitter 34 and a manual controller 40.

The tracked vehicle 10 has various motors and actuators which are used to control driving functions and additional functions. These include, solely by way of example, drive motors 12 by means of which the chain drive is controlled, a winch motor 14 by means of which the cable of a winch can be wound up and unwound, and an extension arm motor 16 which is provided to control the orientation of an extension arm, which is provided for the winch, about the axis 16a. These motors 12, 14, 16 are controlled by the control unit 20, the signal connection being provided by means of a CAN bus 18. A processor 22 of the control unit 20 can use the CAN bus to actuate switchable hydraulic valves (not illustrated) which influence the function of the motors 12, 14, 16 which are in the form of hydraulic motors.

The manual controller 40 is also connected to the control unit 20. The manual controller 40 has a base 42 and a handle 44, the handle 44 being designed such that it can pivot about horizontal pivot axes 44a, 44b in relation to the base. Various control elements 48 in the form of buttons 48a and thumbwheels 48b are provided on the handle. The handle also has a support surface 46 which is ergonomically matched to the shape of the inner surface of a hand of a vehicle driver, said hand resting on the handle.

A situation in which the vehicle driver is influencing the manual controller 40 by operating the switching elements 48a, 48b and by changing the pivot angle of the handle 44 in relation to the base 42 is indicated to the processor 24 of the control unit 20 by means of the CAN bus 18.

In addition to the motors 12, 14, 16 of the vehicle 10 and the manual controller 40, an input touch panel 30, an acoustic signal transmitter 34 and an output screen 32 are also connected to the control unit 20. These input and output devices 30, 32, 34 are each provided in the driver's cab of the vehicle 10, in the region of the driver's seat.

Assigning the operation of the various control elements 48a, 48b and the movement of the handle 44 in relation to the base 42 to individual driving or additional functions is flexible and can be adapted by the vehicle driver. Therefore, the vehicle driver is able to freely define which control elements 48a, 48b and which degree of freedom of the handle are assigned to a respective function of the vehicle 10. This permits firstly adaptation to individual preferences of the vehicle driver and secondly also adaptation to the specific purpose served by the vehicle 10. For example, in a piste-grooming vehicle, the winch function can be set such that it is accessible only by two or more simultaneous or successive key pressing operations. This is expedient if the winch function is used only rarely in the field of application of the specific vehicle 10 since simple operation of the keys can then be allocated more important functions. However, if the vehicle 10 serves a purpose in which the cable winch is used frequently, simple handling is desirable and can be achieved by means of the flexible assignment functionality. The control elements 48a, 48b and degrees of freedom are assigned to the individual functions of the vehicle 10 with the aid of the screen 32 on which the vehicle driver can see which assignments are currently set at any time when performing setting operations by means of the touch panel 30 and the manual controller 40. In this case, it is particularly advantageous for these assignments to be indicated graphically, for example with reference to a schematically illustrated vehicle. When the vehicle driver changes the setting, the new settings are stored in a memory 26 of the control unit 20.

During operation, the control information which is received by the control unit 20 from the manual controller 40 is assigned to the various driving and additional functions by means of the processor 22 and with reference to the assignment data stored in the memory 26, and the corresponding motors 10, 12, 14 and/or actuators are operated in the corresponding manner.

In addition to the control elements 48a, 48b and the degrees of freedom, the control unit 20 also processes output data from touch sensors 50, 52. These touch sensors 50, 52 are provided on the manual controller 40 and serve to identify whether the vehicle driver is currently holding the handle 44 of the manual controller 40. In this case, the function of the first touch sensor 40 is based on a resistance measurement, it being possible for the body temperature of the vehicle driver to influence the resistance. The second touch sensor 52 operates in accordance with another system. It measures the pressure and the force which act on the handle in the direction of a vertical axis 52a. The output signals from these touch sensors 50, 52 are likewise processed by the control unit 20, it being possible to implement different behavior as a function of the touch sensors 50, 52. Therefore, the processor 22 can be programmed in such a way that the drive motors 12 run only when contact by a vehicle driver is detected. If this contact is not present, the drive motors 12 are immediately stopped. It may likewise be expedient to output a warning tone via the acoustic signalling unit 34 as soon as the vehicle driver releases the handle 44.

In the illustrated example, particularly reliable detection is achieved by the presence of two different touch sensors 50, 52. However, one touch sensor is usually sufficient.

Figure 2:
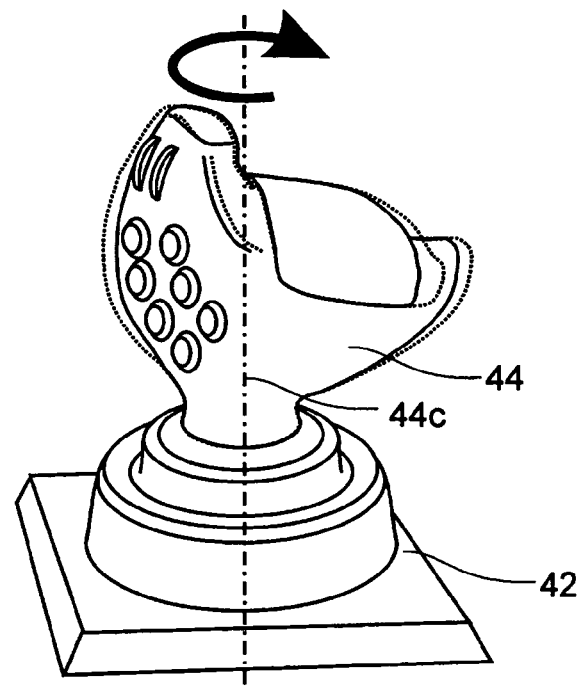
FIGS. 2 to 4 show various dynamic and static degrees of freedom of the manual controller.

FIG. 2 shows a further degree of freedom of the handle 44 in relation to the base 42. In this case, the handle is pivoted about a vertical pivot axis 44c in the relation to the base 42. As a result, a third degree of freedom which can be manipulated by means of the position of the handle 44 is achieved in addition to the ability to pivot about the pivot axes 44a, 44b. This may advantageously be used for controlling driving or additional functions in which deflection proportional to the pivot angle of the handle about the pivot axis 44c is achieved. In the example of FIG. 1, the motor 16, which is responsible for the orientation of the extension arm about the axis 16a, could be influenced by operation of the handle 44 to this effect. In addition to a linear relationship between the pivot angle of the handle 44 about the pivot axis 44c, it may also be advantageous to control the running speed of a motor which is controlled on the basis of this degree of freedom by means of the respective pivot angle, so that further deflection about the pivot axis 44c results in a rapid movement of the associated motor and only slight deflection of the handle 44 about the pivot axis 44c causes slow motor operation.

Spring means (not illustrated) which always apply a force to the handle about the pivot axis 44c in the direction of the normal orientation from FIG. 1 are preferably present within the manual controller 40.

Figure 3:
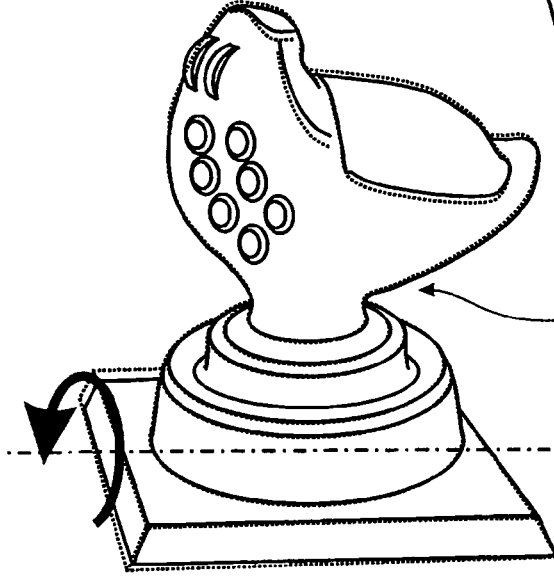
Figure 4:
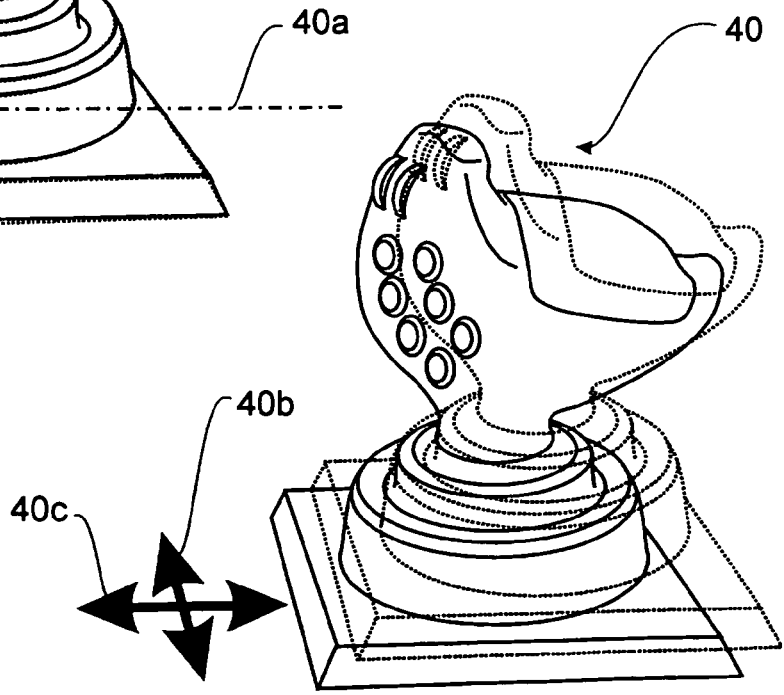

FIGS. 3 and 4 show possible settings for the entire manual controller 40. These serve to orient the manual controller in a manner matched to the vehicle driver, these orientations enabling said vehicle driver to control the machine in a particularly comfortable manner. In the case of these possible settings, not only the handle 44 but also the base 42 is adjusted, together with the handle 44, so that their position relative to one another is not influenced by the corresponding setting operation. In the adjusted position, fixing is then performed by fixing means (not illustrated in any detail), for example by means of locking screws or latching means.

FIG. 3 shows an ability to set which is directed toward pivoting the entire manual controller 40 about a transverse axis 40a of the vehicle. In this case, the dotted-line illustration represents the initial position, compared to which the position illustrated with a solid line represents a correspondingly adjusted setting in which the manual controller 40 is tilted forward.

FIG. 4 shows an ability to set in the plane in which the manual controller has been shifted in a translatory manner out of an initial position (illustrated with dotted lines) in the longitudinal direction 40b of the vehicle and the transverse direction 40c of the vehicle.

The invention claimed is:

1. A vehicle comprising:
    a manual controller for controlling driving functions of the vehicle and/or additional functions of the vehicle, the manual controller having a base and a handle which is movable in relation to the base and is designed such that it is pivotable at least about a substantially horizontal pivot axis for control purposes and
    a control unit which is connected to the manual controller and by means of which output data from at least one manually operable control element and/or output data relating to a pivot position of the handle in relation to the base are processed,
    said control unit including means for facilitating the user to assign the control element and/or the pivot position of the handle to a driving function and/or additional functions,
    said control unit having an output device by means of which the output data from the manual controller are reproduced and
    said control unit being switchable to an inspection mode in which operation of the manual controller is reproduced by the output device, but the driving functions and/or additional functions are not influenced.

2. The vehicle according to claim 1, wherein the manual controller is connected to the control unit by means of a bus system.

3. The vehicle according to claim 1, wherein the output device is an output screen.

4. The vehicle according to claim 1, wherein the additional functions controllable by the manual controller comprise at least one additional function selected from the group consisting of setting the alignment of a rake blade, movement an extension arm, and controlling a winch.

5. A vehicle, comprising:
    a manual controller for controlling driving functions of the vehicle, the manual controller having a base and a handle which is moveable in relation to the base and is designed such that it is pivotable at least about a substantially horizontal pivot axis for control purposes and
    a control unit which is connected to the manual controller and by means of which output data from at least one manually operable control element and/or output data relating to a pivot position of the handle in relation to the base are processed,
    said control unit including means for facilitating the user to assign the control element and/or the pivot position of the handle to a driving function,
    said control unit having an output device by means of which the output data from the manual controller are reproduced and
    said control unit being switchable to an inspection mode in which operation of the manual controller is reproduced by the output device, but the driving functions are not influenced.

* * * * *